United States Patent [19]

Gabrielson et al.

[11] Patent Number: 5,392,258
[45] Date of Patent: Feb. 21, 1995

[54] UNDERWATER ACOUSTIC INTENSITY PROBE

[75] Inventors: Thomas B. Gabrielson, Warminster; James F. McEachern, Newtown; Gerald C. Lauchle, Port Matilda, all of Pa.

[73] Assignee: The United States of America as represented by the Secretary of the Navy, Washington, D.C.

[21] Appl. No.: 136,637

[22] Filed: Oct. 12, 1993

[51] Int. Cl.⁶ .................................................. G01V 1/38
[52] U.S. Cl. ................................. 367/149; 367/135; 367/178; 181/122
[58] Field of Search ............... 367/3, 149, 141, 176, 367/178, 188, 140, 160, 165; 181/122, 401, 402; 310/334

[56] References Cited

U.S. PATENT DOCUMENTS

| | | | |
|---|---|---|---|
| 2,582,994 | 1/1952 | Kendall | 367/173 |
| 3,311,873 | 3/1967 | Schloss | 367/160 |
| 3,332,057 | 7/1967 | Pavey, Jr. | 367/159 |
| 3,900,543 | 8/1975 | Davis | 174/101.5 |
| 4,134,097 | 1/1979 | Cowles | 181/102 |
| 4,397,584 | 8/1983 | Sutherland | 441/23 |
| 4,982,375 | 1/1991 | Ng | 367/135 |
| 5,077,696 | 12/1991 | McEachern et al. | 367/12 |

Primary Examiner—Ian J. Lobo
Attorney, Agent, or Firm—James V. Tura; Susan E. Verona

[57] ABSTRACT

An underwater probe for determining true acoustic intensity by the direct measurement of true acoustic velocity and true acoustic pressure in a neutrally buoyant package, utilizes a moving-coil geophone embedded in a casting of syntactic foam and a pair of hydrophones on the exterior of the casting.

8 Claims, 3 Drawing Sheets

UNDERWATER ACOUSTIC INTENSITY PROBE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates generally to probes for measuring underwater sounds, and more particularly, to a neutrally buoyant probe for directly measuring true underwater acoustic intensity.

Conventional underwater probes are suspended in a body of water, or are allowed to rest upon the floor of a body of water. The measurements that these probes provide can be used to determine sources of noise emission from underwater structures. For instance, the probes can be used to detect distant vessels, perform seismic surveys, or aid in fossil fuel exploration. The probes can also be used to assess the effectiveness and directionality of radiation from underwater sources.

An acoustic intensity measurement provides an indication of the vector energy flux density of an acoustic field. Acoustic intensity is the product of acoustic velocity and acoustic pressure.

The most commonly used technique known in the art for measuring underwater acoustic intensity is the two-hydrophone technique. This technique utilizes a probe consisting of two hydrophones fixed a distance apart. The sum of the outputs provides a direct measurement of the acoustic pressure at the midpoint of the hydrophones. Although the acoustic velocity is not directly measured using this technique, it can be derived. The acoustic velocity can be determined as:

$$V = \frac{P}{\omega \rho l}$$

where (v) is the acoustic velocity; (P) is the difference between the hydrophone outputs; ($\omega$) is $2\pi$ times the frequency; ($\rho$) is the density of water; and (1) is the distance the hydrophones are set apart. The acoustic intensity is then determined as the time-averaged product of the acoustic pressure and velocity.

The two-hydrophone technique has several inherent disadvantages. The derived velocity is a function of frequency, and therefore, each spectral component to be studied must be weighted differently to compensate for the frequency dependence. The distance the hydrophones are set apart can cause inaccurate measurements. Setting the hydrophones too closely together can result in greatly accentuated phase and amplitude errors in the acoustic pressure signal. Setting the hydrophones too far apart can result in the inaccurate measurement of acoustic fields which depart from perfect plane wave behavior.

Another probe for measuring underwater acoustic intensity is disclosed in U.S. Pat. No. 3,311,873. This probe directly measures acoustic pressure and acoustic acceleration. The probe has additional signal processing for integrating acceleration to determine velocity. The acoustic intensity can then be determined from the measured pressure and calculated velocity. This type of probe often introduces phase errors into the intensity calculation, especially in highly reactive fields where pressure and velocity are nearly 90 degrees out of phase. Also, the sensitivity of this probe is frequency dependent, and provides less accurate measurements with lower frequency acoustic waves.

A neutrally buoyant probe is a probe which has an effective density substantially equal to the density of water. A probe which is neutrally buoyant responds to wave motion just as the body of water displaced by the probe would have responded.

An underwater acoustic velocity probe having a neutrally buoyant body is known in the art, and has been described, for example, in U.S. Pat. No. 2,582,994. The probe of U.S. Pat. No. 2,582,994 is an air-tight, rigid, metal sphere encapsulating an acoustic velocity sensor. The disadvantage of such a probe is that a rigid sphere perturbs the acoustic field to a significant degree, causing scattering of wave motion. Further disadvantages of the neutrally buoyant, rigid, spherical probe are that it is large, heavy out of the water, and difficult to machine.

The principal object of this invention is to provide an improved underwater probe for measuring true acoustic intensity. Another object is to provide for simpler and more accurate acoustic intensity computation by directly measuring both acoustic pressure and acoustic velocity. Still another object of the invention is to provide a probe which accurately measures acoustic intensity in highly reactive acoustic fields and over a broad band of frequencies. A further object is to provide a probe which is neutrally buoyant, readily manufactured, compact, and easily handled out of water.

SUMMARY OF THE INVENTION

In accordance with the invention, an underwater probe comprises a casting, an acoustic velocity sensor means completely embedded within, and surrounded by, the casting, and an acoustic pressure sensor means integrated on the outer surface of the casting, thereby exposing a portion of the acoustic pressure sensor means directly to the water in which the probe is suspended. The casting, velocity sensor means, and pressure sensor means are combined together in a neutrally buoyant package.

Means operatively connected to the velocity sensor means and the pressure sensor means computes the time-averaged product of acoustic velocity and pressure.

The casting is made from a syntactic foam which is cast around the acoustic velocity sensor means. The syntactic foam is made of a mixture of epoxy resin and glass microballoons. The foam is cast in a circular, cylindrical shape having two end faces. The foam is rigid, with a density less than that of water, and strong enough to withstand high hydrostatic pressure.

The acoustic velocity sensor means is a moving-coil geophone and is centered within the syntactic foam. A geophone having a vertical sense axis orientation is used to measure vertically traveling acoustic fields. A geophone having a horizontal sense axis orientation is used to measure horizontally traveling acoustic fields. For best results, the sense axis of the vertical or horizontal orientation geophone is aligned with the axis of the circular, cylindrical casting.

A geophone having an arbitrary sense axis orientation is used to measure three-dimensional acoustic fields. Sense axis alignment with the casting is not required for arbitrary orientation geophones. Arbitrary orientation geophones are generally not used for frequencies below 20 Hz. Therefore, to measure very low resonance frequency three dimensional acoustic fields, two geophones, one vertically oriented and one horizontally orientated, may be used.

The acoustic pressure sensor means comprises two hydrophones. The hydrophones are externally mounted on the opposite end faces of the syntactic foam casting, preferably along the sense axis of a vertically or horizontally oriented geophone, or along the axis of the casting for an arbitrarily orientated geophone. The hydrophones are air-packed piezoceramic bender disks which are cast into, or cemented, e.g. by epoxy cement, onto the end faces of the syntactic foam.

In contrast with the probes of the prior art, this neutrally buoyant probe directly measures both acoustic velocity and pressure, providing for a true acoustic intensity measurement of greater accuracy, in all types of acoustic fields, and over a broader band of frequencies. The invention provides a probe having a more compact body than that of the prior art, thereby reducing the scattering effect of the body of the probe. The probe is easy to handle out of water and is readily manufactured.

Other objects, advantages and novel features of the invention will become apparent from the following detailed description of the invention when considered in conjunction with the accompanying drawings.

DESCRIPTION OF THE PREFERRED EMBODIMENTS

Figure 1:
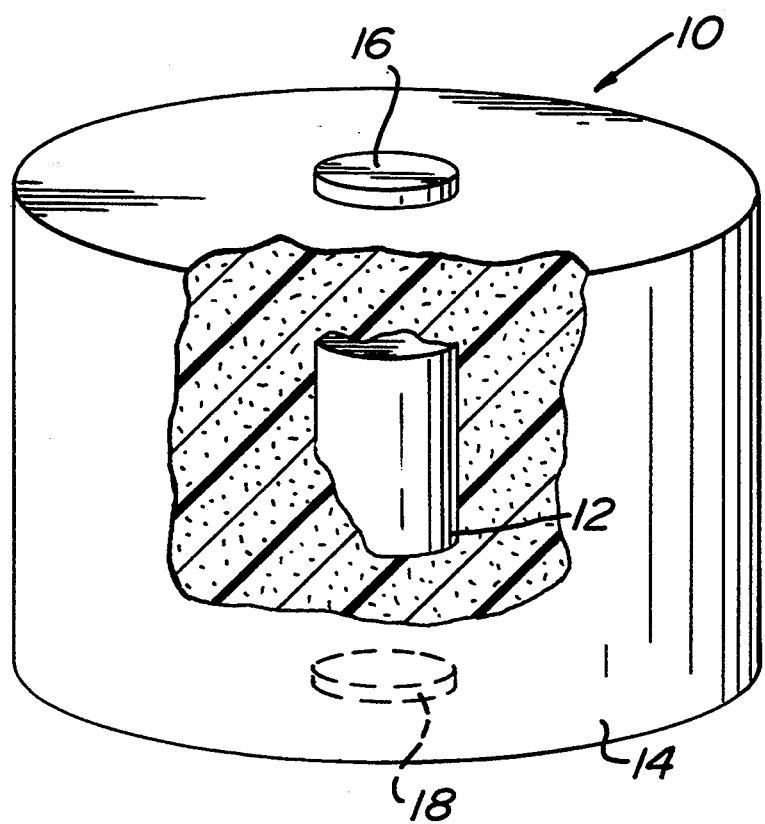
FIG. 1 is a partial cut-away perspective view of an underwater probe according to the invention.

A probe 10 for use underwater to measure true acoustic intensity is shown generally in FIG. 1. Probe 10 is a neutrally buoyant package, so that wave vibrations affect probe 10 just as they would effect the water which probe 10 displaces. A true acoustic velocity sensor 12 directly measures acoustic velocity. Velocity sensor 12 is embedded in a syntactic foam casting 14. Pressure sensors 16 and 18 directly measure acoustic pressure. The pressure sensors 16 and 18 are integrated on the surface of the casting 14, a portion of each pressure sensor 16 and 18 being directly exposed to the surrounded water. Probe 10 determines true acoustic intensity as the time-averaged product of the measured acoustic velocity and pressure.

Velocity sensor 12 is a moving-coil geophone, which generates an electrical signal in response to vibration. The magnitude and frequency of the electrical signal correspond to the magnitude and frequency of the sensed vibration. In probe 10, the voltage output of the geophone is directly proportional to the neutrally buoyant probe's velocity which, in turn, is substantially the same as that of the surrounding water. Thus, the geophone provides a means for directly measuring true acoustic velocity.

Different types of geophones can be used in probe 10. The geophone is selected so that its fundamental resonance is well below the acoustic field frequency range of interest. A vertical, horizontal, or arbitrary orientation moving-coil geophone unit is selected, depending on the acoustic field orientation of interest. For very low resonance frequencies, such as below 20 Hz, generally only vertical or horizontal orientation units are used, so that the use of two probes may be required to measure a low frequency three-dimensional intensity field.

Casting 14 is a rigid syntactic foam material having a density less than that of water and strong enough to withstand high hydrostatic pressure. An appropriate amount of foam is used to allow the entire package of probe 10 to have the same mass as the volume of water it displaces. The cured foam can be trimmed or weighted to achieve neutral buoyancy.

Since the neutrally buoyant probe moves in concert with the acoustically induced motion of water, the probe can be made small regardless of the wavelength of the acoustic field. While the overall package of the intensity probe can be made much smaller than that of a prior art two-hydrophone probe, the non-zero length of the probe still introduces an error in the velocity measurement. It is probably not practical to make the probe shorter than about 3 cm, but this would still permit operation up to 8,000 Hz with less than 5 percent error.

In one embodiment of the invention, the syntactic foam casting 14 is a mixture of epoxy resin and glass microballoons. As shown in FIG. 1, the velocity sensor 12 is centered within a cylindrical-shaped casting 14. This embodiment provides a probe which is compact, light in weight, easy to handle out of water, and easy to fabricate. The small size and circular, cylindrical shape greatly reduce the effect of acoustic field scattering.

Pressure sensors 16 and 18 are pressure hydrophones. The sum of the outputs of pressure hydrophones 16 and 18 provide probe 10 with a measurement of true acoustic pressure at a point midway between the locations of the hydrophones. Since the probe only requires the pressure signals to be added, phase and amplitude matching is not critical as in prior art probes. Pressure hydrophones 16 and 18 can be spaced equal distances apart from velocity sensor 12 and centered along the orientation axis of velocity sensor 12, so that the location of the measured acoustic pressure is the same as the location of the measured acoustic velocity. Pressure hydrophones 16 and 18 can be cast into the end faces of casting 14, or cemented on casting 14 after the foam has cured. An air-backed piezoceramic bender disk is an example of the type of hydrophone which can be used in probe 10.

In use, the probe is suspended underwater at a desired elevational measurement point and oriented in a desired measurement direction. The probe can be suspended by wire having an appropriate stiffness characteristic which does not materially degrade probe performance.

For instance, 32 AWG, or smaller, PVC insulated wire can be used.

Figure 2:
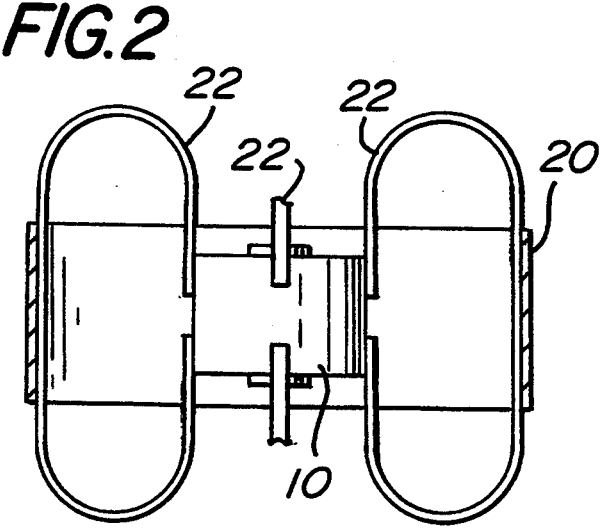
FIG. 2 is a fragmentary elevational view of an embodiment of suspension apparatus for use with the probe.
Figure 3:
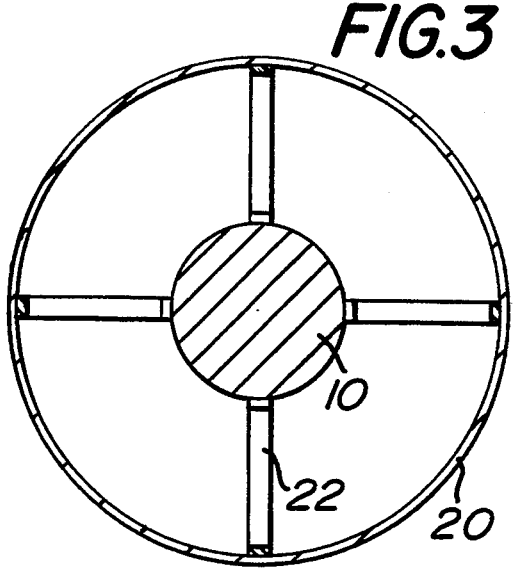
FIG. 3 is a plan view of the suspension apparatus of FIG. 2.
Figure 4:
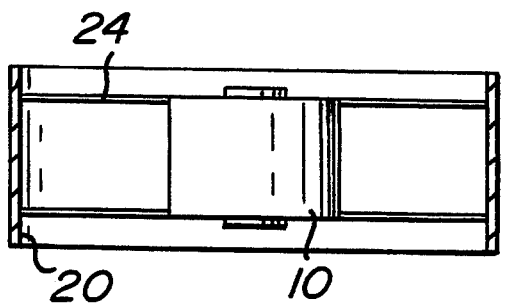
FIG. 4 is a fragmentary elevational view of a second embodiment of a suspension apparatus for use with the probe.
Figure 5:
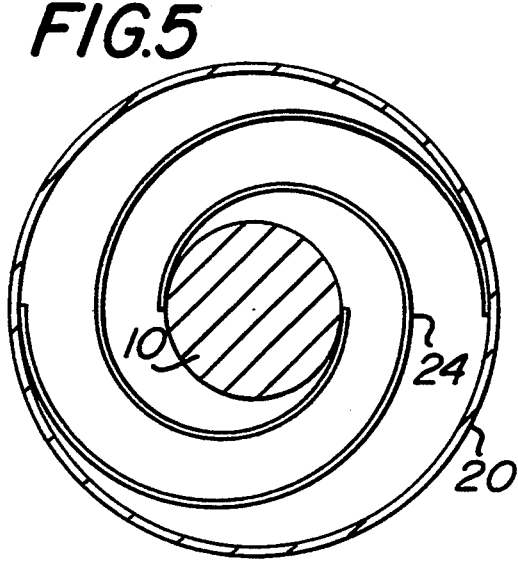
FIG. 5 is a plan view of the suspension apparatus of FIG. 4.
Figure 6:
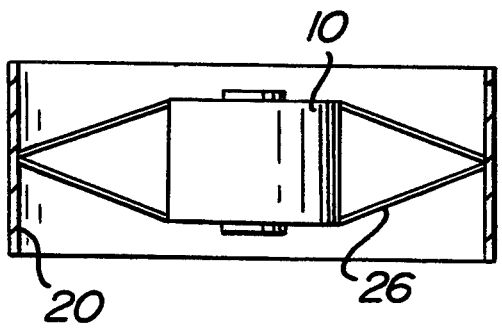
FIG. 6 is a fragmentary elevational view of a third embodiment of a suspension apparatus for use with the probe.
Figure 7:
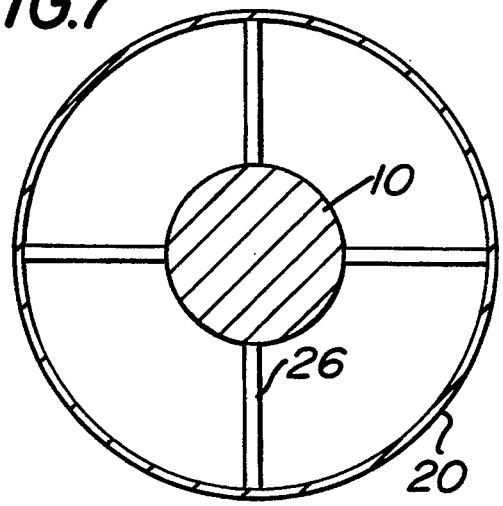
FIG. 7 is a plan view of the suspension apparatus of FIG. 6.

Some applications may require frequent adjustments to the probe axis and location. In these instances, suspension apparatus which readily accommodates such adjustments must be used. FIGS. 2 and 3 illustrate one type of suspension apparatus. Probe 10 is centered within a ring 20 by four equally spaced apart plastic strips 22. Plastic strips 22 allow probe 10 to move within ring 20 in reaction to an acoustic field. The orientation axis of probe 10 is positioned along the central axis of ring 20, such that the motion of probe 10 will occur substantially along the central axis of ring 20. The central axis of ring 20 is aligned with the path of the acoustic field, such that the acoustic field will pass through ring 20 substantially parallel to the walls of ring 20. FIGS. 4 and 5 show an alternative embodiment of a suspension apparatus using small diameter spring wires 24 to connect probe 10 within ring 20. A third embodiment is shown in FIGS. 6 and 7, in which rubber bands 26 are used to connect probe 10 within ring 20.

Signals generated by velocity sensor 12 and pressure sensors 16 and 18 are multiplied and averaged to provide true acoustic intensity. Probe 10 can produce pressure and velocity signals to be recorded separately for later processing. Alternatively, simple electronic circuitry (not shown) can be cast into casting 14 so that acoustic intensity can be calculated within probe 10. Another alternative is to connect the signal output leads to a device for calculating acoustic intensity.

Figure 8:
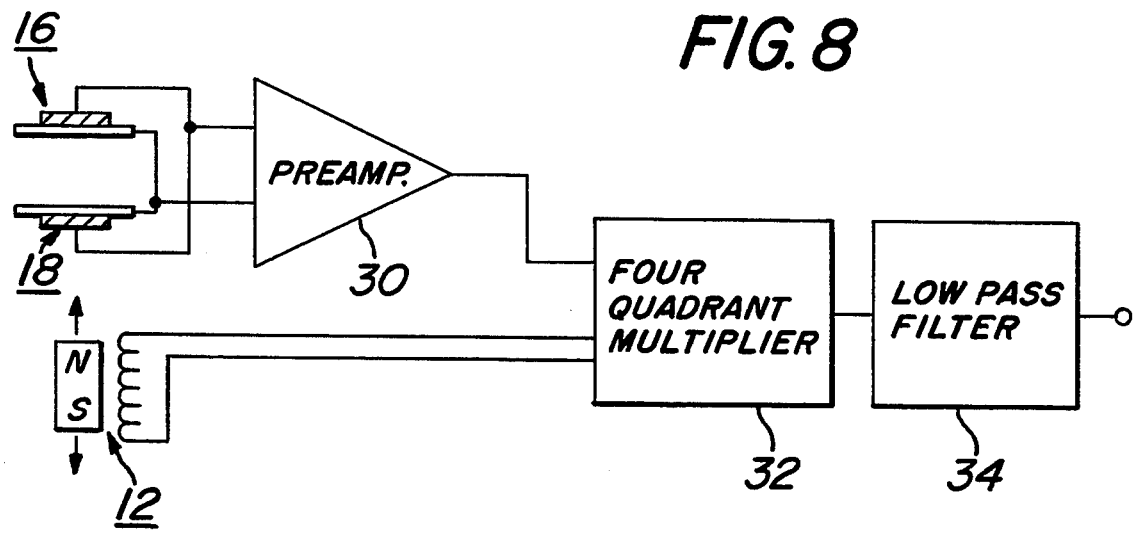
FIG. 8 is a schematic diagram of one embodiment of electronics of the probe.

FIG. 8 illustrates electronic circuitry for calculating acoustic intensity. Pressure hydrophones 16 and 18 are connected in parallel between two input leads of a preamplifier 30. Connecting the two hydrophones in parallel increases the source capacitance, thereby reducing noise and effects of lead capacitance. Preamplifier 30 sums the outputs of the pressure hydrophones 16 and 18. The gain of preamplifier 30 is appropriately adjusted to produce the proper relation between the pressure and velocity signals. A multiplier 32 is connected to the output leads of the velocity sensor 12 and preamplifier 30. Multiplier 32 multiplies the pressure and velocity signals to produce a true acoustic intensity signal. A very-low-frequency low pass filter 34 is connected to multiplier 32 to time average the acoustic intensity signal.

Figure 9:
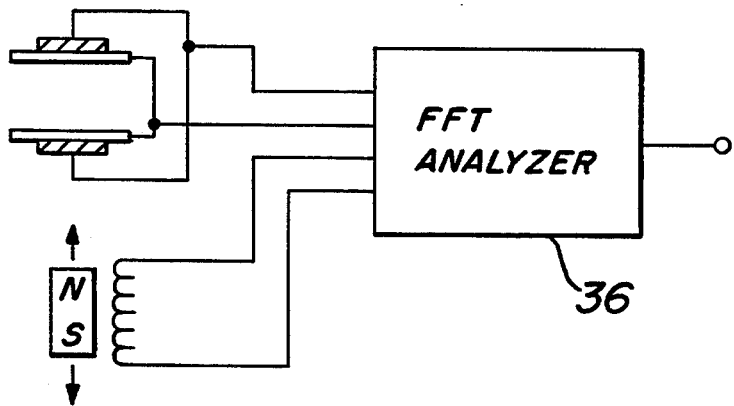
FIG. 9 is a schematic diagram of an alternative embodiment of the electronics of the probe.

FIG. 9 shows an alternative mode of operation in which the pressure and velocity signal outputs of the hydrophones and velocity sensor are connected to a dual-channel FFT (Fast Fourier Transform) analyzer 36. The FFT analyzer 36 provides a measurement of acoustic intensity for each of a large number of frequency cells into which the frequency spectrum is divided. It also indicates reactive power in terms of phase angle.

The FFT analyzer 36 can also isolate problems with non-acoustic fluid motions. For instance, the FFT analyzer 36 can detect a non-acoustic fluid motion by comparing the signal produced by the velocity sensor, which senses any fluid motion, to the pressure sensor, which has an extremely weak response to non-acoustic disturbances.

With the FFT analyzer 36, high-quality, true acoustic intensity measurements can be easily produced over wide ranges of frequency in underwater acoustic fields.

Various modifications can be made to the apparatus described. For example, any rigid material is suitable as a casting or housing around the velocity sensor provided the density of the sensor is the same as the fluid in which measurement are to be made. Alternatively, the sensor can be made more or less dense than the fluid it displaces, and a sensor transfer function can be determined and taken into account in acoustic intensity calculations. This can be accomplished by calibrating the output of the sensor to a known acoustic velocity field, such as a plane progressive wave.

Many other modifications and variations of the invention are possible in view of the above disclosure. It is therefore to be understood that, within the scope of the following claims, the invention may be practiced otherwise than as specifically described.

We claim:

1. An underwater probe for determining true acoustic intensity, comprising:
    a moving-coil geophone for sensing acoustic velocity;
    a rigid foam cast around said moving-coil geophone, said rigid foam having an outer surface;
    a plurality of hydrophones integrated on said outer surface of said rigid foam for measuring acoustic pressure;
    wherein said moving-coil geophone, said rigid foam, and said plurality of hydrophones constitute a neutrally buoyant package in water; and
    means operatively connecting to said moving-coil geophone and said plurality of hydrophones for computing a time-averaged product of the acoustic velocity and the acoustic pressure.

2. An underwater probe according to claim 1, wherein the rigid foam has a density less than water and is strong enough to withstand high hydrostatic pressure.

3. An underwater probe according to claim 2, wherein the rigid foam is made of a mixture of epoxy resin and glass microballoons.

4. An underwater probe according to claim 3, wherein the rigid foam is cast in a circular, cylindrical shape having two end faces and a central axis.

5. An underwater probe according to claim 4, wherein the means for computing is a dual channel Fast Fourier Transform analyzer.

6. An underwater probe according to claim 5, wherein the moving-coil geophone has a sense axis; wherein said sense axis is aligned with said central axis of the rigid foam; and wherein the plurality of hydrophones consists of two hydrophones externally mounted on opposite end faces of the rigid foam along said sense axis of said moving-coil geophone.

7. An underwater probe according to claim 6, wherein the hydrophones are air-backed piezoceramic bender disks.

8. An underwater probe for determining true acoustic intensity, comprising:
    a moving-coil geophone for measuring acoustic velocity, said moving-coil geophone having a sense axis;
    a syntactic foam cast around said moving-coil geophone, said syntactic foam having a density less than that of water and being strong enough to withstand high hydrostatic pressure;
    two hydrophones externally mounted on said syntactic foam for measuring acoustic pressure, said hydrophones being located on opposite ends of the syntactic foam along the sense axis of the moving-coil geophone;
    wherein the moving-coil geophone, the syntactic foam, and the two hydrophones constitute a neutrally buoyant package in water; and
    means operatively connected to the moving-coil geophone and the two hydrophones for computing a time-averaged product of acoustic velocity and acoustic pressure.

* * * * *